United States Patent [19]
Sung

[11] Patent Number: 5,282,361
[45] Date of Patent: Feb. 1, 1994

[54] DEVICE FOR FACILITATING EXHAUST ACTION OF AN INTERNAL COMBUSTION ENGINE

[76] Inventor: Lee D. Sung, Rm A-106, Hanshin Apt., #258 NonHyun-Dong, Kangnam-Ku, Seoul, Rep. of Korea

[21] Appl. No.: 889,039

[22] Filed: May 26, 1992

[30] Foreign Application Priority Data

May 27, 1991 [KR] Rep. of Korea ............. 91-8657
Jun. 26, 1991 [KR] Rep. of Korea ............. 91-10622

[51] Int. Cl.⁵ ............................................. F02B 35/00
[52] U.S. Cl. ...................................... 60/315; 60/316; 60/317; 60/319
[58] Field of Search .................. 60/315, 316, 317, 319

[56] References Cited

U.S. PATENT DOCUMENTS

| | | | |
|---|---|---|---|
| 3,016,692 | 1/1962 | Iapella | 60/316 |
| 4,339,918 | 7/1982 | Michikawa | 60/316 |
| 4,671,060 | 6/1987 | Wilkens | 60/319 |

FOREIGN PATENT DOCUMENTS

| | | | |
|---|---|---|---|
| 803980 | 7/1936 | France | 60/316 |
| 2453044 | 10/1980 | France | |
| 2577276 | 8/1986 | France | 60/315 |
| 55-127829 | 8/1980 | Japan | |
| 57-59924 | 4/1982 | Japan | |
| 57-137723 | 8/1982 | Japan | |
| 59-34015 | 3/1986 | Japan | |
| 61-62226 | 4/1986 | Japan | |
| 2-30922 | 2/1990 | Japan | |

*Primary Examiner*—Douglas Hart
*Attorney, Agent, or Firm*—Vidas, Arrett & Steinkraus

[57] ABSTRACT

The present invention relates to a device for facilitating exhaust action of an internal combustion engine being used as a power-transmitting source of a vehicle, using a depression phenomenon resulted from induction and acceleration of air resistance due to forward movement of the vehicle (motor cars, vessels, airplanes or the like), thereby an output and a combustion efficiency of the internal combustion engine. To overcome problems of the forced exhaust method in the conventional internal combustion engine and improve the output and the combustion efficiency of the internal combustion engine, the present invention provides a device for facilitating exhaust action of the internal combustion engine comprising a guided flow depression device and a forced exhaust device, wherein combustion gases are exhausted by working fluids when the vehicle moves at a constant speed or more, and are exhausted by the forced exhaust device with the motor when the vehicle moves at a constant speed or less.

5 Claims, 3 Drawing Sheets

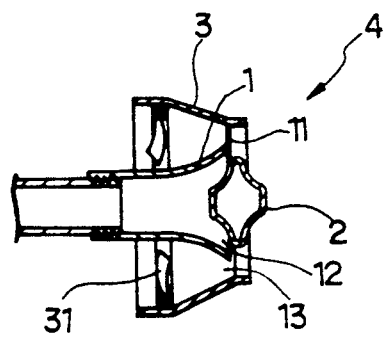
FIG.4
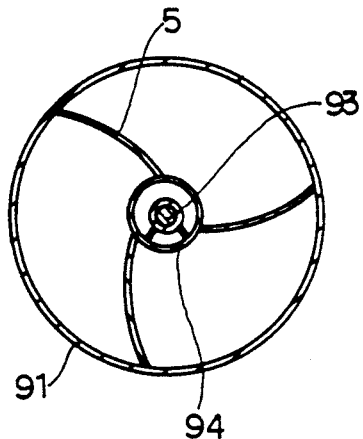
FIG.5B
FIG.5A
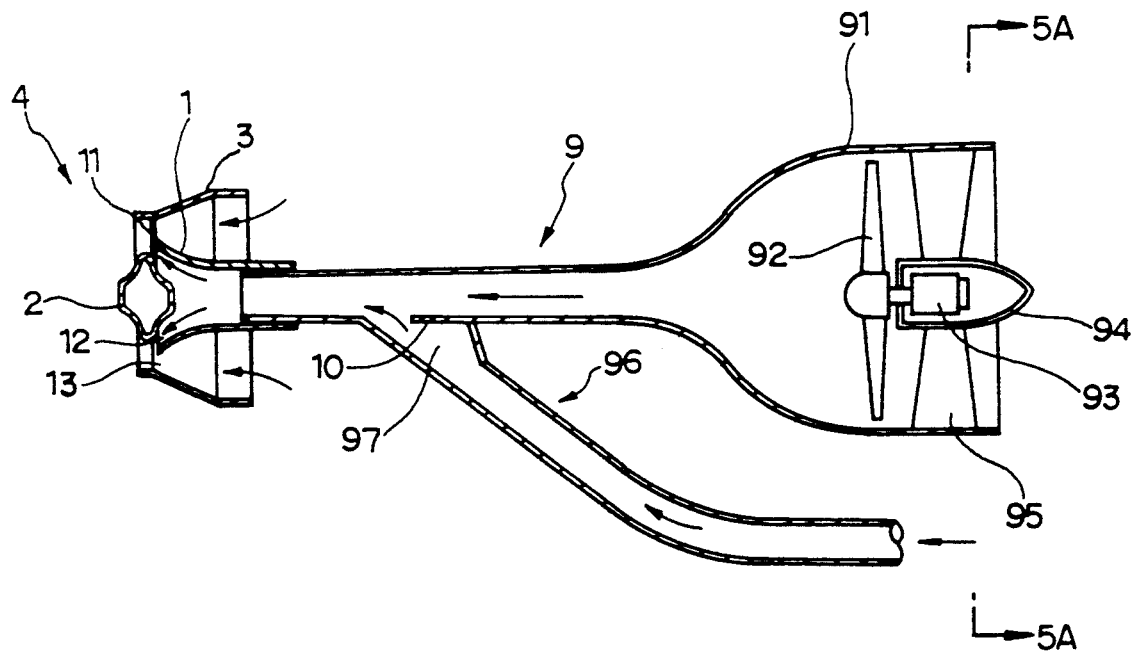

DEVICE FOR FACILITATING EXHAUST ACTION OF AN INTERNAL COMBUSTION ENGINE

BACKGROUND OF THE INVENTION

1. Field of the Invention

The present invention relates to a device for facilitating exhaust action of an internal combustion engine being used as a power-transmitting source of a vehicle, using a depression phenomenon resulting from the induction and acceleration of air resistance due to forward movement of a vehicle such as a motor cycle, a motor car, a vessel, an airplane or the like, thereby improving the output and combustion efficiency of the internal combustion engine.

2. Description of Prior Art

Generally, the output of an internal combustion engine is increased as the number of cycles increases, a cycle being composed of a suction stroke, a compression stroke, an explosion stroke and an exhaust stroke.

However, in the conventional combustion engine having high output and a large number of cycles, the exhaust process is not favorable in that a device for reducing harmful components of exhaust gases and a silencer are disposed within an exhaust pipe, thereby disturbing exhaustion of combustion gases, and a passive exhaustion method forcedly pushing out combustion gases by explosion energy of the internal combustion engine is employed in the exhaust process.

A DOHC engine having a multi valve system is well known as one internal combustion engine for overcoming and improving the above-mentioned disadvantages, the multi-valve system being equipped with 4 to 5 valves to increase the cycle. This engine can increase the output due to constructional characteristics thereof, but can not decrease back pressure.

SUMMARY OF INVENTION

Therefore, it is the primary object of the present invention to provide a device for facilitating the exhaust action of an internal combustion engine that improves a power output and a combustion efficiency thereof.

In accordance with the present invention, a device for facilitating exhaust action of an internal combustion engine includes a guided flow depression device comprising a diverging exhaust passage and a converging air passage, and a forced exhaust device with a motor, wherein combustion gases are exhausted by flow depression phenomenon when a vehicle moves at a constant speed or more, and are exhausted by a forced exhaust device with a motor when the vehicle moves at a constant speed or less.

BRIEF DESCRIPTION OF THE DRAWINGS

The invention will become more readily apparent from the following description of preferred embodiments thereof shown, by way of example only, in the accompanying drawings.

FIG. 4 is a cross sectional view illustrating the fourth embodiment of the exhaust device of the present invention.

FIG. 5A is a cross sectional view illustrating the fifth embodiment of exhaust device of the present invention.

FIG. 5B is a cross sectional view of the exhaust device taken along lines 5A-5A of FIG. 5A.

DESCRIPTION OF THE PREFERRED EMBODIMENT

Figure 1A:
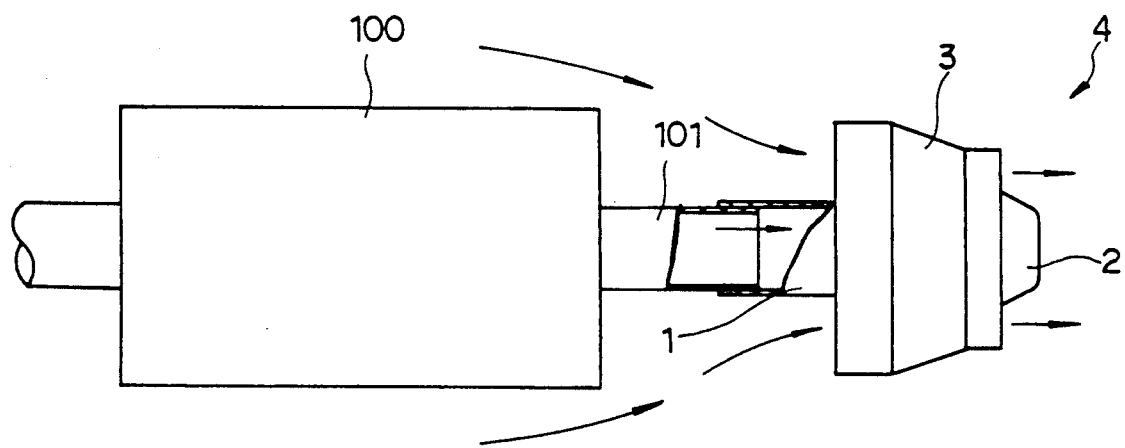
FIG. 1A is a front view illustrating the first embodiment of the exhaust device according to the present invention.
Figure 1B:
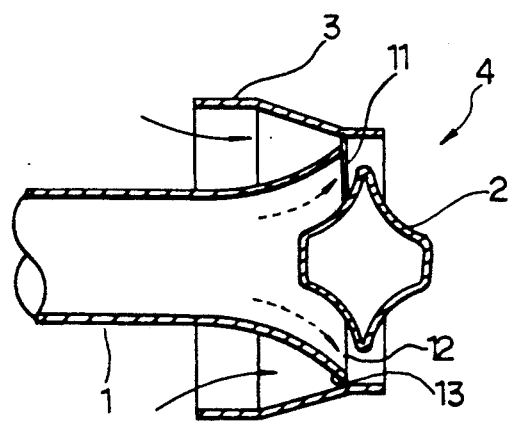
FIG. 1B is a cross sectional view of the exhaust device shown in FIG. 1A.
Figure 1C:
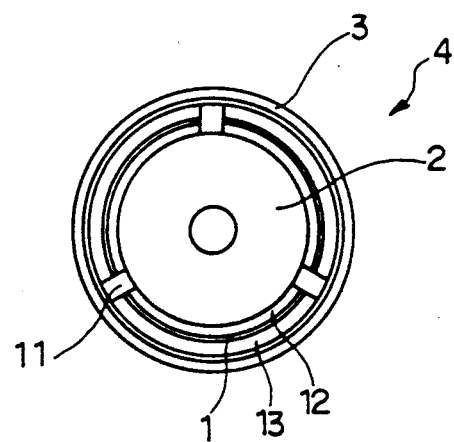
FIG. 1C is a rear view of the exhaust device shown in FIG. 1A.

Referring now to the drawings, and first to FIGS. 1A, 1B and 1C, a device for facilitating exhaust action of an internal combustion engine is shown. The exhaust device includes a silencer 100, an exhaust pipe 101, and a guided flow depression device 4 comprising a diverging pipe 1 with a divergent end thereof and disposed at one side of the exhaust pipe 101, a reduced diverging exhaust passage 12 formed within the diverging pipe 1, a gas lead 2 tapered from the center thereof to front and rear, a portion of which is inserted into the diverging pipe and the other portion thereof is projected on the outside to form the reduced diverging exhaust passage 12, a supporting plate 11 used to weld the edge of the center of the gas lead 2 at the end portion of the diverging pipe 1, an air guide 3 for guiding air according to the movement of a vehicle, fixed by the supporting plate 11 and having an opening which is larger than the outer diameter of the diverging pipe 1 and the rear portion of said air guide is smaller than the front portion thereof, and a converging air passage 13 formed between the opening of the air guide 3 and the end portion of the diverging pipe 1.

Figure 2:
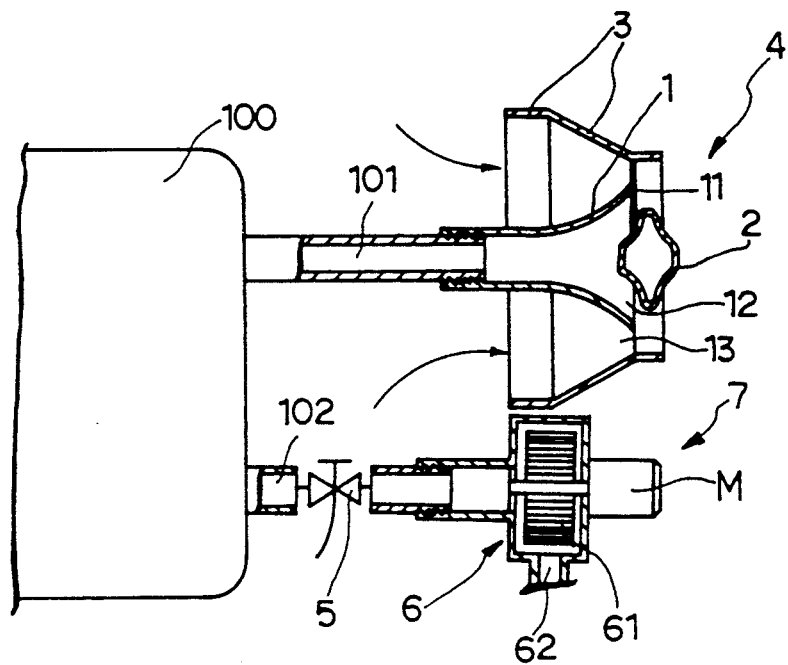
FIG. 2 is a cross sectional view illustrating the second embodiment of the exhaust device of the present invention.

Looking now at FIG. 2, the guided flow depression device 4 is installed parallel to a forced exhaust device 7, showing the second embodiment of the present invention. The forced exhaust device 7 comprises a housing 6 having an exhaust valve 5 opened and closed at another exhaust pipe 102 according to the movement speed of the vehicle, a DC motor M operated at the opening of the exhaust valve 5, a fan 61 being rotated by the DC motor, and a gas outlet 62 formed at the outside of the fan 61, gases being exhausted therefrom by rotating the fan 61.

Figure 3:
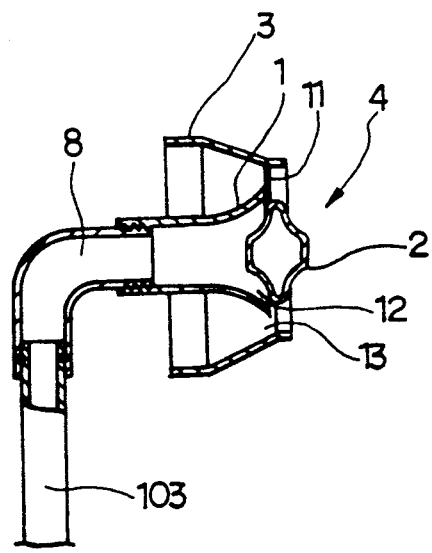
FIG. 3 is a cross sectional view illustrating the third embodiment of the exhaust device of the present invention.

Looking now at FIG. 3, the third embodiment of the present invention is illustrated. In this embodiment, the guided flow depression device 4 connected with an elbow pipe 8 is preferably installed in a large-sized special truck (for example, an oil tanker etc.), a ship or the like which have the exhaust pipe mounted perpendicular to the ground, the elbow pipe 8 being coupled rotatably to an exhaust pipe 103. The elbow pipe 8 is rotated so that the opening portion of the air guide 3 is located along the movement direction of the vehicle, and a rotational force of the elbow 8 acts as a resisting pressure against air flowing into the air guide 3 and passing through the converging air passage 13.

Looking now at FIG. 4, the guided flow depression device 4 includes fan 31 for flowing and rotating gases, which is bearing-coupled to the inside of the opening of the air guide 3 to improve the flow rate of air.

Looking now at FIG. 5, the guided flow depression device 4 is connected with another forced exhaust device which is different from that of FIG. 2 to exhaust gases more rapidly. The forced exhaust device comprises a pipe 9 connected to the back side of the diverging pipe 1 in the form of a straight line, a largely opened gas guide 91 formed at the front side of the pipe 9, a fan motor 93 attached to a motor housing 94, supportably installed in the air guide by supports 95 and having a fan 92 operated at a constant speed (30~40 km/h) or less, a slanted exhaust pipe 96 having an expanded portion 97 formed at a position which is connected with the pipe 9, and a horizontal baffle 10 mounted between the pipe 9 and the expanded portion 97.

The operation and effect aspects of the present invention will be explained in detail. When the vehicle moves forward with the operation of the internal combustion engine, the vehicle is subjected to an air resistance. At this time, as air is introduced into the opening of the air guide 3 and discharged through the converging air passage 13 to the atmosphere at a speed proportional to the speed of the vehicle, gases are speedily exhausted outward due to a diverging flow depression phenomenon which results from air passage through the diverging exhaust pipe 12 and a guided flow depression phenomenon resulting from air passing through the converging air passage 13. In other words, the guided flow depression device 4 can reduce back pressure and facilitate exhaust action of the internal combustion engine, since the device 4 simultaneously performs the divergence and depression of the exhaust gases by the diverging exhaust passage 12 formed between the diverging pipe 1 and the gas lead 2, and high speed guided air depression resulting from high speed air passing through the converging air passage 13 formed between the diverging pipe 1 and the air guide 3. Therefore, the guided flow depression device 4 may minimize carbonized residue in the cylinder and thus improve the performance of the internal combustion engine. The above-mentioned effects may be expected when the vehicle moves at a constant speed (of 40 km/h or more). However, in case that the vehicle moves at a constant speed or less, with the forced exhaust device 7 shown in FIG. 2, the gases are forcedly exhausted from the exhaust pipe 102 through the gas outlet 62 of the housing 6 to outside as the DC motor M rotates the fan 61 by the battery of the vehicle. At this time, the exhaust valve 5 disposed within the exhaust pipe 102 is opened and operated at only a constant speed or less, the constant speed being set on a speed indicator of an instrument board, whereas the exhaust valve 5 is closed at a constant speed or more and therefore all the gases are exhausted through the guided flow depression device 4.

According to the preferred embodiment of the present invention illustrated in FIG. 4, the object of the present invention may be more readily accomplished because the bearing-coupled fan 31 rotates and uniformly guides air flowing into the air guide 3.

In the fifth embodiment of the present invention shown in FIGS. 5a-5b, gases are exhausted more rapidly due to exhaust action by the device 4 and favoring inflow of airs by the air guide 91. In addition, gases exhausted from the exhaust pipe 101 to the slanted exhaust pipe 96 are discharged still more rapidly, with a divergence and depression at the expanded portion 97 and a depression according to Bernoulli's law applied to a flow rate of gases passing between the device 4 and the air guide 91, and if necessary, the fan 92 may be utilized in order to forcedly flow gases, the fan 92 being driven by the low-speed fan motor 93.

As described above with respect to the exhaust device of the present invention, the more a running or cruising speed of the vehicle is increased, the more depression and absorption forces of gases from the internal combustion engine are produced, and thus gases are exhausted rapidly and the exhaust pipe develops a low-vacuum condition. Accordingly, the exhaust device of the present invention can improve the combustion efficiency and the output of the internal combustion engine by raising a cycle capacity, the cycle comprising a suction stroke, a compression stroke, an explosion stroke, and an exhaust stroke, because a great deal of air is supplied in the cylinder.

It will be apparent that many modifications and variations are possible within the scope of the invention as defined in appended claims.

I claim:

1. A device for facilitating exhaust action of an internal combustion engine including:
   a silencer (100);
   an exhaust pipe (101, 102, 103); and
   a guided flow depression device (4) comprising a diverging pipe (1) with a divergent side thereof and disposed at one side of said exhaust pipe (101), a reduced diverging exhaust passage (12) formed within said diverging pipe (1), a gas lead (2) tapered from the center thereof to the front and rear thereof to form the reduced diverging exhaust passage (12), a supporting plate (11) used to weld the edge of the center of said gas lead (2) to the end portion of said diverging pipe (1), an air guide (3) for guiding air according to the movement of a vehicle, fixed by said supporting plate (11) and having an opening which is larger than the outer diameter of said diverging pipe (1) and the rear portion of the air guide is smaller than the front portion thereof and a converging air passage (13) formed between said opening of said air guide (3) and said end portion of said diverging pipe (1).

2. The device as recited in claim 1, further including a forced exhaust device(7) comprising a housing(6) having an exhaust valve(5) opened and closed at another exhaust pipe(102) according to the speed of said vehicle, a DC motor(M) operated at the opening and closing of said exhaust valve(5), a fan 61 being rotated by said DC motor(M), and a gas outlet(62) formed at the outside of said fan(61) and exhausting gases therefrom by rotating said fan(61).

3. The device as recited in claim 1, wherein said guided flow depression device(4) is connected with an elbow pipe(8) coupled to the end portion of said exhaust pipe(103) and is rotated in proportion to the movement of said vehicle.

4. The device as recited in claim 1 or 3, wherein said guided flow depression device 4 has a fan(31) for flowing and rotating air, which is bearing-coupled to the inside of said opening of said air guide 3.

5. The device as recited in claim 1, further including another forced exhaust device comprising a pipe (9) connected to the back side of said diverging pipe (1) in the form of a straight line, a largely opened gas guide (91) formed at the front side of said pipe (9), a fan motor (93) attached to a motor housing (94), supportably installed by supports (95) and having a fan (92) operated at a constant speed or less, a slanted exhaust pipe (96) having an expanded portion (97) formed at a position which is connected with said pipe (9), and a horizontal baffle (10) mounted between said pipe (9) and said expanded portion (97).

* * * * *